United States Patent
Tseng

(10) Patent No.: US 9,056,414 B2
(45) Date of Patent: Jun. 16, 2015

(54) HOT PRESSING EQUIPMENT FOR FORMING SPHERICAL PORTIONS OF LIGHT GUIDE BODIES

(71) Applicant: HON HAI PRECISION INDUSTRY CO., LTD., New Taipei (TW)

(72) Inventor: Yung-Chang Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 65 days.

(21) Appl. No.: 13/900,568

(22) Filed: May 23, 2013

(65) Prior Publication Data
US 2014/0186482 A1 Jul. 3, 2014

(30) Foreign Application Priority Data
Dec. 27, 2012 (TW) .............................. 101150698 A

(51) Int. Cl.
| | |
|---|---|
| *B29C 35/16* | (2006.01) |
| *B29C 39/38* | (2006.01) |
| *B29C 43/36* | (2006.01) |
| *B29C 33/04* | (2006.01) |
| *B29C 35/04* | (2006.01) |
| *B29C 43/02* | (2006.01) |
| *B29L 11/00* | (2006.01) |

(52) U.S. Cl.
CPC .................. *B29C 43/36* (2013.01); *B29C 33/04* (2013.01); *B29C 35/04* (2013.01); *B29C 35/041* (2013.01); *B29L 2011/0075* (2013.01); *B29C 43/027* (2013.01)

(58) Field of Classification Search
CPC ...... B29C 43/36; B29C 43/027; B29C 43/52; B29C 33/04; B29C 35/04; B29C 35/041; B29L 2011/0075
USPC .............. 425/407, 408; 249/120, 121, 79–81, 249/105
See application file for complete search history.

(56) References Cited

U.S. PATENT DOCUMENTS

| | | | | |
|---|---|---|---|---|
| 2,379,793 | A | * | 7/1945 | Eenigenburg ................. 264/275 |
| 2,850,767 | A | * | 9/1958 | Ford ............................. 264/275 |
| 5,603,871 | A | * | 2/1997 | Koseko et al. ................ 425/407 |
| 6,675,852 | B2 | * | 1/2004 | Calmidi et al. ............... 100/326 |

* cited by examiner

*Primary Examiner* — Joseph S Del Sole
*Assistant Examiner* — Thukhanh T Nguyen
(74) *Attorney, Agent, or Firm* — Novak Druce Connolly Bove + Quigg LLP

(57) ABSTRACT

Exemplary hot pressing equipment for forming spherical portions of light guide bodies includes a top pressing plate, a bottom pressing plate facing to the top pressing plate, a heating unit located in the top pressing plate or the bottom pressing plate to raise the temperature of the top pressing plate and the bottom pressing plate, and a cooling tube located between the top pressing plate and the bottom pressing plate. Grooves having spherical end surfaces array on the top pressing plate and the bottom pressing plate. The cooling tube delivers cooling fluid to reduce the temperature of the top pressing plate and the bottom pressing plate.

14 Claims, 2 Drawing Sheets

HOT PRESSING EQUIPMENT FOR FORMING SPHERICAL PORTIONS OF LIGHT GUIDE BODIES

BACKGROUND

1. Technical Field

The present disclosure relates to hot pressing equipment that melts workpieces, and particularly, to hot pressing equipment for forming spherical portions of light guide bodies.

2. Description of Related Art

An electronic incense stick is a light guide body having an opaque coating on the outer surface and a spherical portion on the top end. Light emitted from a light source is guided to the spherical portion to simulate a burning traditional incense stick.

In manufacturing, one end of the light guide body is manually polished to form the spherical portion. The manual polishing wastes time and manpower, and the spherical portions of multiple light guide bodies may have different shapes.

Therefore, it is desirable to provide means which can overcome the limitations described.

BRIEF DESCRIPTION OF THE DRAWINGS

The components of the drawings are not necessarily drawn to scale, the emphasis instead being placed upon clearly illustrating the principles of embodiments of the present disclosure. Moreover, in the drawings, like reference numerals designate corresponding parts throughout the views.

DETAILED DESCRIPTION

Figure 1:
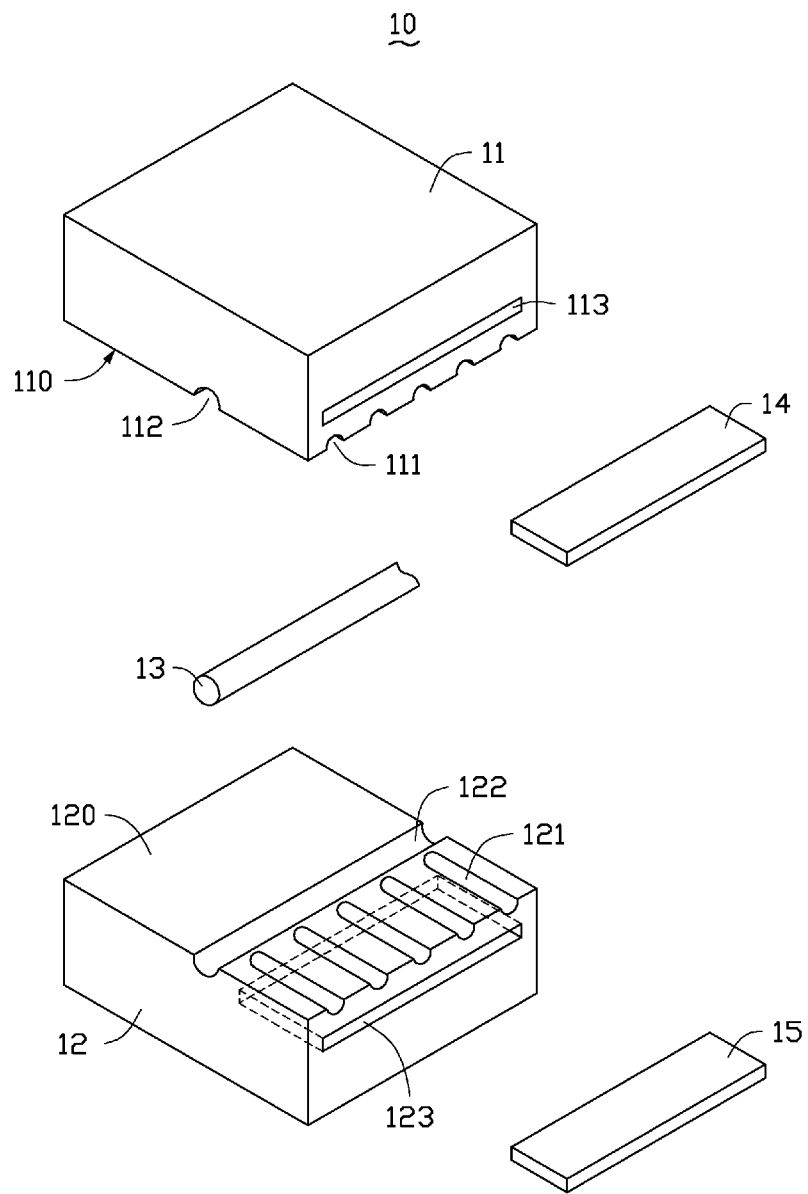
FIG. 1 is schematic view of hot pressing equipment, of one embodiment.

FIG. 1 shows hot pressing equipment 10 for forming spherical portions of light guide bodies, in accordance with one embodiment. The hot pressing equipment 10 includes a top pressing plate 11, a bottom pressing plate 12, a cooling tube 13, a top heating sheet 14, and a bottom heating sheet 15.

The top pressing plate 11 is identical with the bottom pressing plate 12, and faces toward the bottom pressing plate 12. The top pressing plate 11 includes a bottom surface 110 facing the bottom pressing plate 12. A plurality of first grooves 111 and a second groove 112 are defined in the bottom surface 110. The first grooves 111 are semicylindrical, and parallel with each other. The second groove 112 is semicylindrical, and perpendicular to each of the first grooves 111. Each of the first grooves 111 has a spherical end surface near the second groove 112. A first slot 113 is defined above the first grooves 111, and the top heating sheet 14 is located in the first slot 113. The top heating sheet 14 is employed to heat the top pressing plate 11. The top heating sheet 14 receives a current to generate heat energy to raise the temperature of the top pressing plate 11.

The material of the top pressing plate 11 is metal or alloy, for example, copper, aluminum, or an alloy of copper or aluminum.

The bottom pressing plate 12 includes a top surface 120 facing the top pressing plate 11. A plurality of third grooves 121 and a fourth groove 122 are defined in the top surface 120. The third grooves 121 are semicylindrical, and parallel with each other. The fourth groove 122 is semicylindrical, and perpendicular to each of the third grooves 121. Each of the third grooves 121 has a spherical end surface near the fourth groove 122. A shape cooperatively defined by each third groove 121 together with a corresponding one of the first grooves 111 is identical to the shape of one of a plurality of electronic incense sticks that can be made by the hot pressing equipment 10. The cooling tube 13 is fitted in a cylindrical space cooperatively defined by the second groove 112 and the fourth groove 122. A second slot 123 is defined under the third grooves 121, and the bottom heating sheet 15 is located in the second slot 123. The bottom heating sheet 15 is employed to heat the bottom pressing plate 12. The bottom heating sheet 15 receives a current to generate heat energy to raise the temperature of the bottom pressing plate 12.

The material of the bottom pressing plate 12 is metal or alloy, for example, copper, aluminum, or an alloy of copper or aluminum.

The cooling tube 13 contains cooling fluid to lower the temperature of the top pressing plate 11 and the bottom pressing plate 12. The cooling fluid can be cooling water or cooling air, for example.

In other embodiments, the hot pressing equipment 10 can comprise a plurality of cooling tubes 13 to lower the temperature of the top pressing plate 11 and the bottom pressing plate 12 fast.

In other embodiments, the hot pressing equipment 10 can comprise only the top heating sheet 14 or the bottom heating sheet 15.

In a process of using the hot pressing equipment 10, a plurality of light guide bodies are put into the third grooves 121 of the bottom pressing plate 12. The light guide bodies can be hollow tubes or solid rods, and can be made of glass or plastic for example. Then the top pressing plate 11 is attached onto the bottom pressing plate 12. The top heating sheet 14 and the bottom heating sheet 15 heat the top pressing plate 11 and the bottom pressing plate 12, respectively. A portion of each of the light guide bodies near the second groove 112 and the fourth groove 122 is melted. The light guide bodies are pushed toward the cooling tube 13, and portions of the first grooves 111 and the third grooves 121 near the second grooves 112 and the fourth grooves 122 are filled with melted light guide body material. The top heating sheet 14 and the bottom heating sheet 15 stop heating the top pressing plate 11 and the bottom pressing plate 12. Cooling fluid passes through the cooling tube 13 continuously to lower the temperature of the top pressing plate 11 and the bottom pressing plate 12. The melted portions of the light guide bodies are thereby solidified. Thus, electronic incense sticks including spherical portions are formed.

Figure 2:
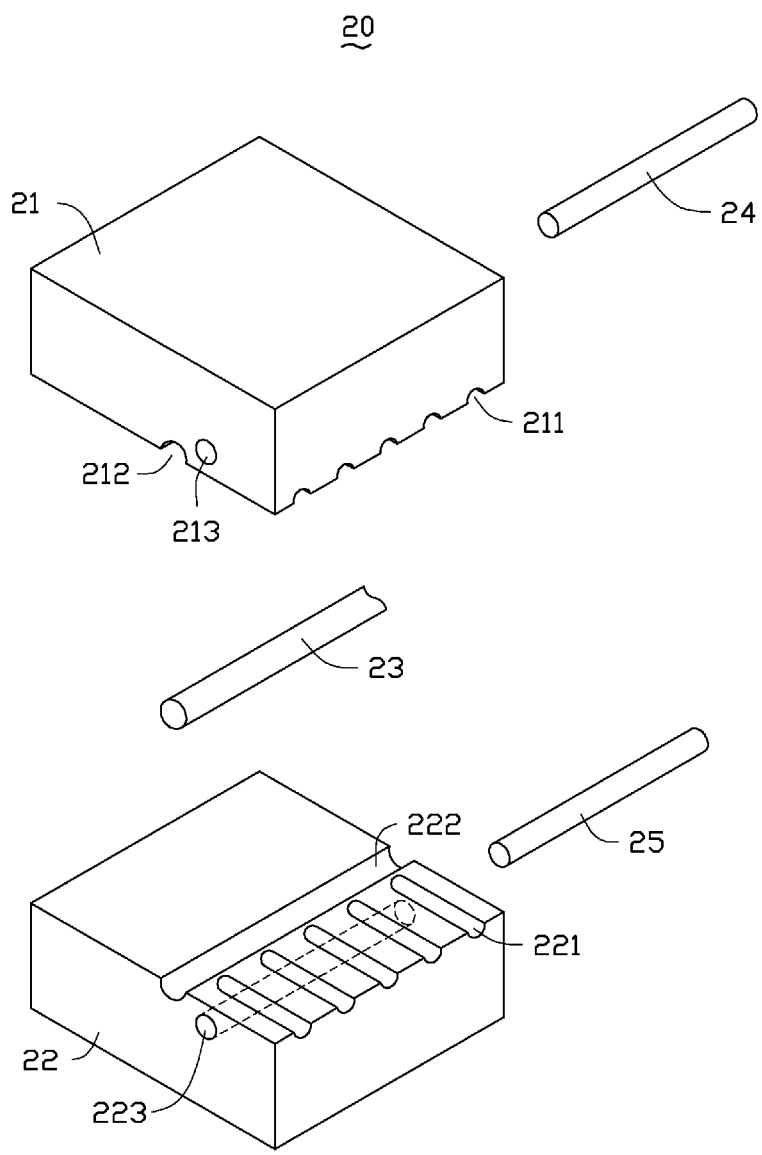
FIG. 2 is schematic view of hot pressing equipment, of another embodiment.

FIG. 2 shows hot pressing equipment 20 in accordance with another embodiment. The hot pressing equipment 20 includes a top pressing plate 21, a bottom pressing plate 22, a cooling tube 23, a top heating tube 24, and a bottom heating tube 25. The top pressing plate 21 is identical with the bottom pressing plate 22.

A plurality of first grooves 211 and a second groove 212 are defined in the top pressing plate 21. A plurality of third grooves 221 and a fourth groove 222 are defined in the bottom pressing plate 22. The cooling tube 23 is fitted in a cylindrical space cooperatively defined by the second groove 212 and the fourth groove 222, to lower the temperature of the top pressing plate 21 and the bottom pressing plate 22.

A first through hole 213 is defined in the top pressing plate 21 above the first grooves 211. The first through hole 213 is near the second groove 212. The top heating tube 24 is located in the first through hole 213 to heat the top pressing plate 21. A second through hole 223 is defined in the bottom pressing plate 22 under the third grooves 221. The second through hole 223 is near the fourth groove 222. The bottom heating tube 25 is located in the second through hole 223 to heat the bottom pressing plate 22.

In other embodiments, the hot pressing equipment 20 can comprise only the top heating tube 24 or the bottom heating tube 25.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments.

What is claimed is:

1. Hot pressing equipment for forming spherical portions of light guide bodies, the hot pressing equipment comprising:
    a top pressing plate, comprising a plurality of first grooves and a second groove perpendicular to each of the first grooves, the first grooves parallel with each other, each of the first grooves comprising a spherical end surface near the second groove;
    a bottom pressing plate facing the top pressing plate and comprising a plurality of third grooves corresponding to the first grooves and a fourth groove corresponding to the second groove, each of the third grooves comprising a spherical end surface near the fourth groove;
    a top heating unit located in the top pressing plate and configured to heat the top pressing plate;
    a bottom heating unit located in the bottom pressing plate and configured to heat the bottom pressing plate; and
    a cooling tube located in a space cooperatively defined by the second groove and the fourth groove, the cooling tube configured for lowering the temperature of the top pressing plate and the bottom pressing plate.

2. The hot pressing equipment of claim 1, wherein the top pressing plate has a first slot defined therein above the first grooves, and the first slot contains the top heating unit.

3. The hot pressing equipment of claim 2, wherein the top heating unit is a heating sheet.

4. The hot pressing equipment of claim 3, wherein the bottom pressing plate has a second slot defined therein under the third grooves, and the second slot contains the bottom heating unit.

5. The hot pressing equipment of claim 4, wherein the bottom heating unit is a heating sheet.

6. The hot pressing equipment of claim 1, wherein the top pressing plate has a first through hole defined above the first grooves, and the first through hole contains the top heating unit.

7. The hot pressing equipment of claim 6, wherein the top heating unit is a heating tube.

8. The hot pressing equipment of claim 7, wherein the bottom pressing plate has a second through hole defined under the third grooves, and the second through hole contains the bottom heating unit.

9. The hot pressing equipment of claim 8, wherein the bottom heating unit is a heating tube.

10. The hot pressing equipment of claim 1, wherein the cooling tube contains cooling fluid.

11. The hot pressing equipment of claim 10, wherein the cooling fluid is cooling water or cooling air.

12. The hot pressing equipment of claim 1, wherein the material of the top pressing plate is selected from the group consisting of copper, aluminum, an alloy of copper, and an alloy of aluminum.

13. The hot pressing equipment of claim 1, wherein the material of the bottom pressing plate is selected from the group consisting of copper, aluminum, an alloy of copper, and an alloy of aluminum.

14. Hot pressing equipment for forming spherical portions of light guide bodies, the hot pressing equipment comprising:
    a top pressing plate, comprising a plurality of first grooves and a second groove perpendicular to each of the first grooves, the first grooves parallel with each other, each of the first grooves comprising a spherical end surface near the second groove;
    a bottom pressing plate facing the top pressing plate and comprising a plurality of third grooves corresponding to the first grooves and a fourth groove corresponding to the second groove, each of the third grooves comprising a spherical end surface near the fourth groove;
    a heating unit located in one of the top pressing plate and the bottom pressing plate, the heating unit configured to heat the corresponding top pressing plate or bottom pressing plate; and
    a cooling tube located in a space cooperatively defined by the second groove and the fourth groove, the cooling tube configured for lowering the temperature of the top pressing plate and the bottom pressing plate.

* * * * *